UNITED STATES PATENT OFFICE.

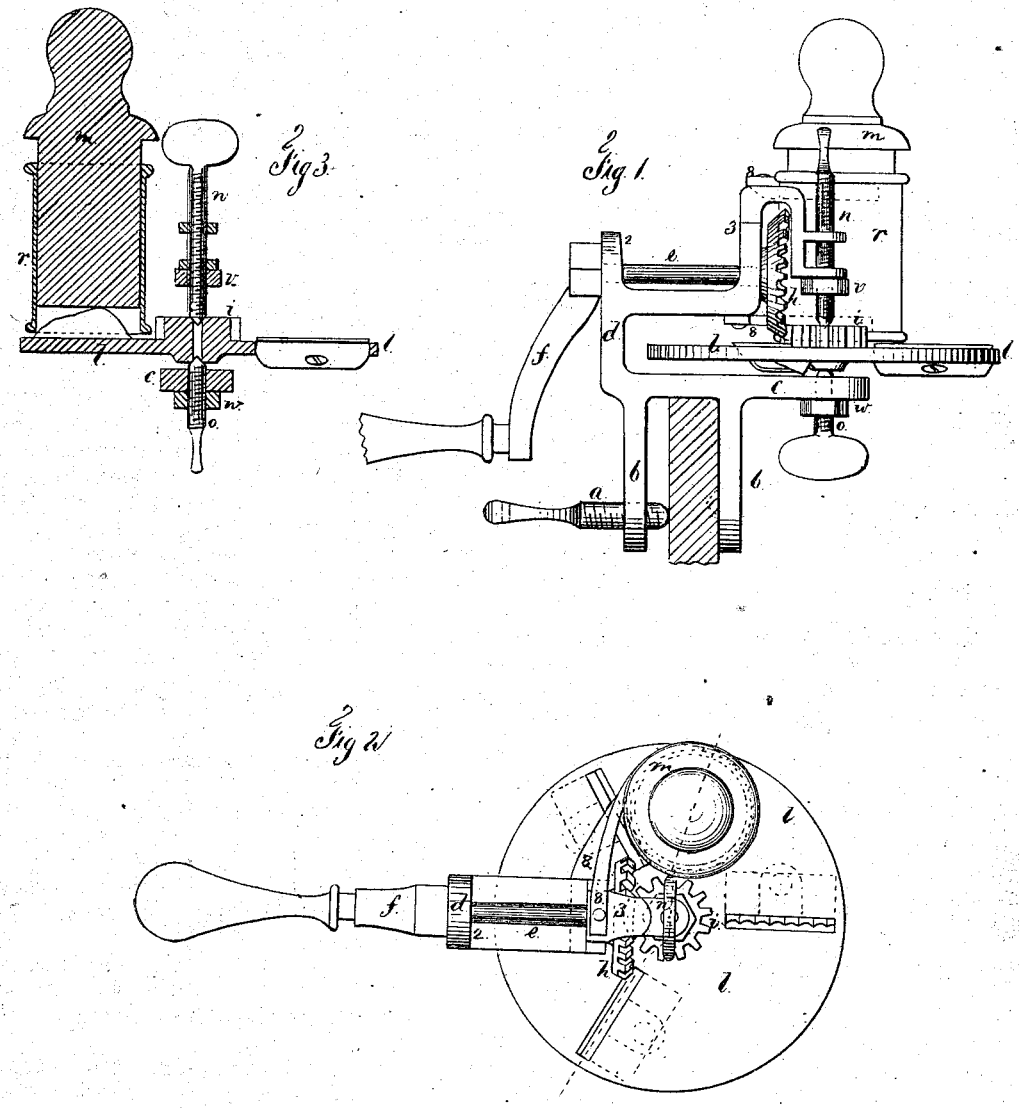

ELIE MONEUSE, OF NEW YORK, N. Y.

IMPROVEMENT IN VEGETABLE-SLICERS.

Specification forming part of Letters Patent No. 158,803, dated January 19, 1875; application filed May 27, 1874.

*To all whom it may concern:*

Be it known that I, ELIE MONEUSE, of the city and State of New York, have invented an Improved Slicer for Potatoes, &c., of which the following is a specification:

Slicers have been made in which a revolving disk is employed containing cutting-blades that remove successive slices from the potatoes or other vegetables placed in a hopper. In these machines the potatoes are liable to turn around, and the slices are unequal in size or thickness.

My machine is made for cutting the potatoes in slices of uniform thickness, in order that the pieces may be exposed to a corresponding frying operation, and all similarly cooked, instead of some pieces being burned while the thicker pieces are not done.

I employ a cutter-plate revolved horizontally between two set-screws, so that the parts can be adjusted, wear compensated for, and looseness in the gearing or in the disk prevented. A hopper of cylindrical or prismatic form is used therewith, and is adapted to receive potatoes supplied one at a time in succession, so that the potatoes are sliced with uniformity as they are pressed down upon the surface of the cutting-disk.

In the drawing, Figure 1 is a side view of the machine. Fig. 2 is a plan, and Fig. 3 is a section through the center of the disk and feeding-cylinder.

The clamping-screw *a* and jaws *b* serve to attach the machine to a box or other receptacle for the sliced potato or other vegetable, and the frame *c d* is formed with or attached to this clamping-jaw. The driving-shaft *e* is to be revolved by a crank-handle, *f*, and it is sustained in the portions 2 3 of the frame *d*, and carries at its end the spur-wheel *h*, that gears into a pinion, *i*, near the hub of the cutter-disk *l*. The portion 3 of the frame is extended over the wheel *h*, and receives the center screw *n*, and a similar screw, *o*, passes up from the part *c* of the frame, and between these screws *n* and *o* the cutter-disk is sustained and adjusted, so that there will not be unnecessary friction; neither will there be any looseness of the parts.

I have shown the screws *n* and *o* with conical points entering cavities in the hub of the disk, and a lubricating-hole passing from one cavity to the other. The ends, however, of the screws *n* and *o* may be recessed, and the disk provided with central projecting teats or cones entering such recesses in the ends of the screws. The set-nuts *v w* prevent the screws becoming loose.

In the disk *l* are openings with inclined seats for receiving the plane-irons that act as cutters. These cutters may be plain or corrugated, and set at any desired distance from the surface of the disk, so as to cut the required thickness of slice; and if the knives are properly positioned and corrugated they can be made to cut up cylindrical or polygonal strips of vegetable substance, or to cut fluted undulating or flat slices. The feeding-cylinder *r* is open at both ends, and it is secured in place by the straps 8 8, or arms, and into it the potatoes are placed one by one and pressed down by hand, the preceding potato being forced down by the succeeding one until entirely cut up.

If desired, a plunger, *m*, might be employed in the cylinder *r*, to press the last portion of the potato down against the cutters until fully sliced up.

This construction of machine allows of one disk being removed, and another substituted with different kinds of knives, and the simplicity of construction is such that an ordinary cook can adjust the parts and keep the machine in order, and the machine is rapid in operation and cheap in construction.

I claim as my invention—

The horizontal revolving cutter-disk sustained between the screws *n* and *o*, in combination with the frame *c d*, bent arm 3, and gear-wheels, as set forth.

Signed by me this 22d day of May, A. D. 1874.

ELIE MONEUSE.

Witnesses:
GEO. T. PINCKNEY,
GEO. D. WALKER.